(12) United States Patent
Xu et al.

(10) Patent No.: US 9,822,941 B2
(45) Date of Patent: Nov. 21, 2017

(54) UPRIGHT LAMP HAVING LENGTH ADJUSTABLE LAMP-POST

(71) Applicant: Wanjiong Lin, Ningbo (CN)

(72) Inventors: Guojun Xu, Ningbo (CN); Zhaoyong Zheng, Ningbo (CN); Wanjiong Lin, Ningbo (CN)

(73) Assignee: Self Electronics Co., Ltd., Ningbo (CN)

( * ) Notice: Subject to any disclaimer, the term of this patent is extended or adjusted under 35 U.S.C. 154(b) by 354 days.

(21) Appl. No.: 14/586,616

(22) Filed: Dec. 30, 2014

(65) Prior Publication Data

US 2015/0247611 A1    Sep. 3, 2015

(30) Foreign Application Priority Data

Feb. 28, 2014    (CN) .......................... 2014 1 0092941

(51) Int. Cl.
| | |
|---|---|
| *F21S 8/08* | (2006.01) |
| *F21V 21/10* | (2006.01) |
| *F21V 17/12* | (2006.01) |
| *F21V 21/22* | (2006.01) |
| *F21Y 115/10* | (2016.01) |

(52) U.S. Cl.
CPC ................ *F21S 8/08* (2013.01); *F21V 17/12* (2013.01); *F21V 21/10* (2013.01); *F21V 21/22* (2013.01); *F21Y 2115/10* (2016.08)

(58) Field of Classification Search
CPC .. F21S 8/08; F21V 17/12; F21V 21/22; F21V 21/10

USPC .......................................................... 362/413
See application file for complete search history.

(56) References Cited

U.S. PATENT DOCUMENTS

| | | | | | |
|---|---|---|---|---|---|
| 2,362,481 | A | * | 11/1944 | Hartmann .............. | H01R 31/00 174/69 |
| 2,793,286 | A | * | 5/1957 | Stiffel .................... | F16M 13/00 108/59 |
| 3,593,013 | A | * | 7/1971 | Mertes ..................... | A61N 5/01 250/493.1 |
| 4,453,204 | A | * | 6/1984 | Warshawsky ........... | F21S 6/002 248/296.1 |
| 4,867,702 | A | * | 9/1989 | Curtenius ............... | F21V 21/02 439/527 |
| 5,124,899 | A | * | 6/1992 | Hale ..................... | A63B 63/083 362/253 |
| 5,221,141 | A | * | 6/1993 | Swanson ................. | F21S 6/008 362/249.05 |

(Continued)

*Primary Examiner* — Bryon T Gyllstrom
(74) *Attorney, Agent, or Firm* — Wang Law Firm, Inc.

(57) ABSTRACT

An upright lamp having length adjustable lamp-post includes a lamp-post, a plug mounted on the lamp-post, and a fastener configured for connecting the lamp-post and the plug. The lamp-post has a jack opened therein. The plug is inserted into the jack. The plug has a uniform cross section area and cross section shape with that of the jack. A hole is opened in the plug along axial direction thereof and is configured for receiving the fastener. The hole is intersected with a side wall of the plug. When the fastener is threaded into the volume formed by the plug and the lamp-post, the interference fit joint between the fastener and the volume is realized as the volume is less than that of the fastener. And then, the mounting base module and the fastener are assembled onto the lamp-post.

9 Claims, 5 Drawing Sheets

(56) References Cited

U.S. PATENT DOCUMENTS

| | | | | |
|---|---|---|---|---|
| 5,615,946 A * | 4/1997 | Yeh | ............... | F21S 6/003 362/249.01 |
| RE39,084 E * | 5/2006 | Hagen | ............... | F21V 21/30 362/267 |
| 2004/0160781 A1 * | 8/2004 | Farmer | ............... | F21S 6/003 362/414 |
| 2010/0220489 A1 * | 9/2010 | Konop | ............... | B60P 3/18 362/428 |
| 2013/0265780 A1 * | 10/2013 | Choksi | ............... | F21V 21/145 362/373 |
| 2014/0104831 A1 * | 4/2014 | Beausoleil | ............... | F21V 33/006 362/235 |

\* cited by examiner

UPRIGHT LAMP HAVING LENGTH ADJUSTABLE LAMP-POST

RELATED APPLICATION

This present application claims benefit of the Chinese Application, CN201410092941.2, filed on Feb. 28, 2014.

BACKGROUND

1. Technical Field

The present application relates to lighting devices, and more particularly to an upright lamp having length adjustable lamp-post.

2. Description of the Related Art

Lamps are a very common device in our daily life, such as roadside lamp, factory lighting, and household lighting device. Owing to different locations and purposes, lamps have various kinds of shapes, colors and fixings. However, it is impossible for indicating every problem of lamps and the present invention is focused on the length adjustable structure for upright lamp.

To meet the need of each purpose for use, lamps are designed into fixed, movable or semi-movable types; semi-movable type relates to the type of lamps fixedly installed at specific place but their elevation or angle is adjustable. For most of lamps, the length of lamp-post of lamp is fixed and cannot be adjusted when the lamp is assembled into a position. However, according to different desires, it may be need to extend illumination area or narrow the distance of illumination of the lamp. Therefore, the length of the lamp-post of the lamp need to adjusted in order to satisfy the above requirements. Moreover, the lighting devices always have uniform standard in commercial lighting in which the lighting devices are assembled on a large scale. However, because of different lighting occasions and lighting desires, it needs to prepare different length of lamp-posts. In result, the lamp-post of the lamp must be cut randomly according to the different occasions and different desires so as to adapt to the massively assembly.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The present application is illustrated by way of example and not by way of limitation in the figures of the accompanying drawings. It should be noted that references to "an" or "one" embodiment in this disclosure are not necessarily to the same embodiment, and such references mean at least one.

Figure 1:
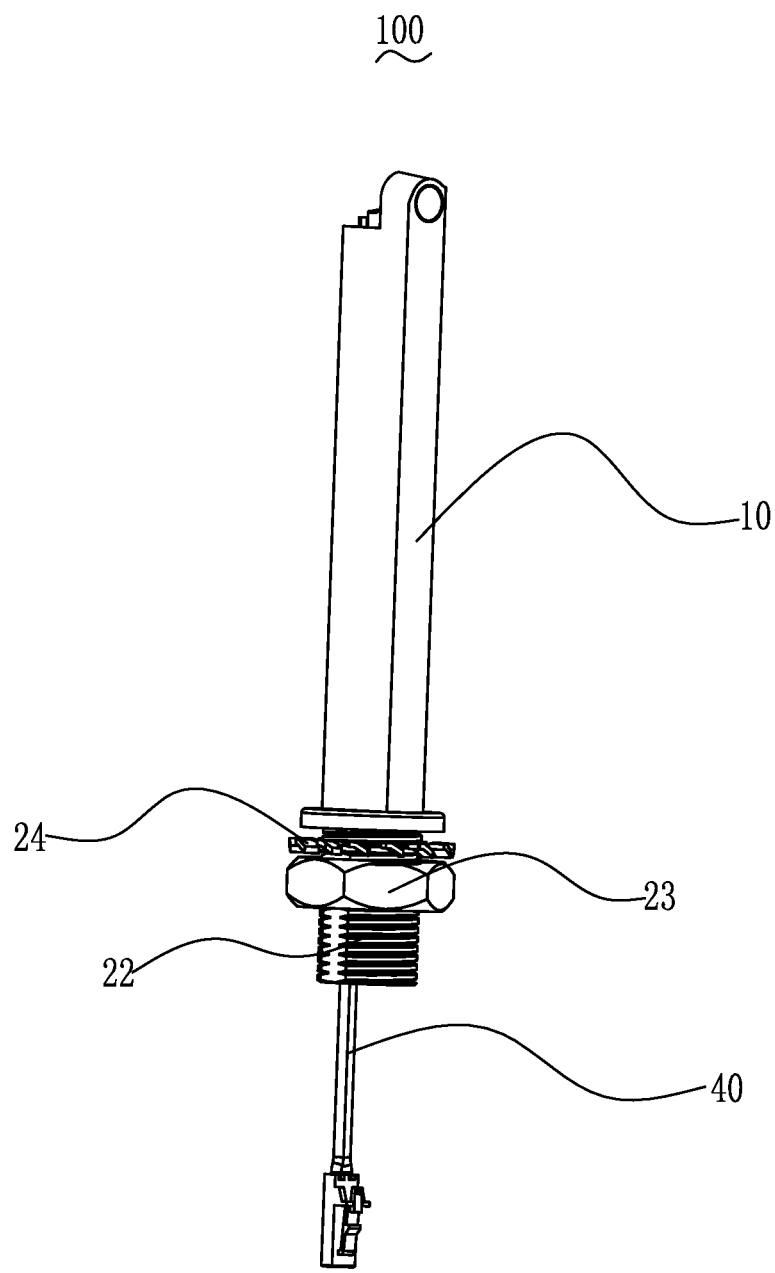
FIG. 1 is an isometric view of an upright lamp having length adjustment lamp-post according to a first embodiment.
Figure 2:
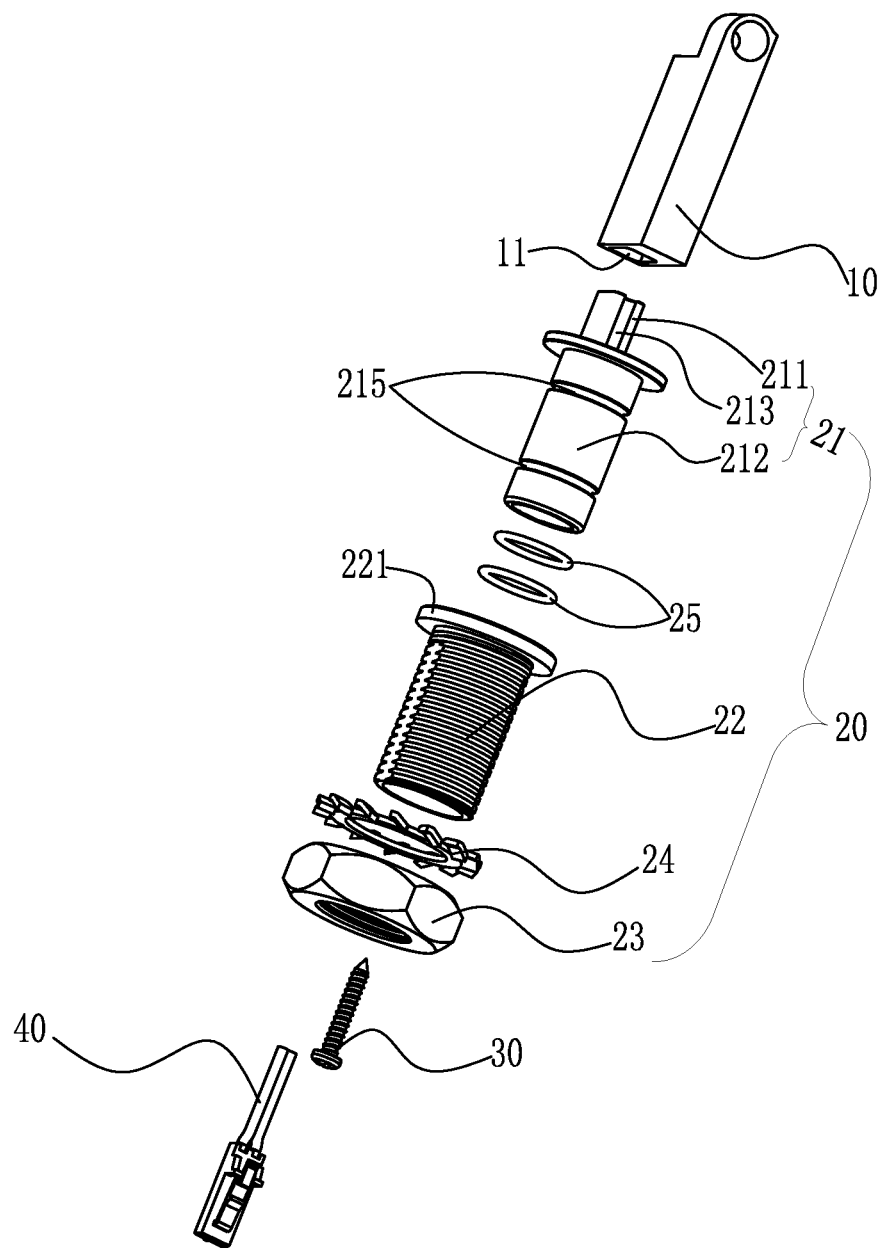
FIG. 2 is an explosive view of the upright lamp having length adjustment lamp-post of FIG. 1

Referring to FIG. 1 and FIG. 2, an upright lamp 100 having length adjustment lamp-post according to a first embodiment is shown. The upright lamp 100 includes a lamp-post 10, a mounting base module 20 disposed in the lamp-post 10, and a fastener 30 configured for connecting the lamp-post 10 and the mounting base module 20. As well known for a person in the skilled art, the upright lamp 100 may includes other function apparatus, such as power, wires, light source, controller, and so on.

The lamp-post 10 may be made of plastic or metal and has an arbitrary shape. In the present embodiment, the lamp-post 10 is made of metal and has an elongated shape. The lamp-post 10 has a jack 11 opened therein along the longitudinal direction thereof. The jack 11 has an arbitrary cross section shape. In the present embodiment, the jack 11 has a rectangle shape of the cross section. The depth of the jack 11 along the axial direction may be predetermined according to design requirements. The jack 11 may be a blind hole or a through hole which runs through the whole lamp-post 10 along the axial direction thereof. In the present embodiment, the jack 11 is a through hole.

The mounting base module 20 includes a connector 21, a clamping sleeve 22 sheathed on the outer wall of the connector 21, a clamp nut 23 sheathed on the outer wall of the clamping sleeve 22, and a gasket 24 arranged between the clamping sleeve 22 and the clamp nut 23.

Figure 3:
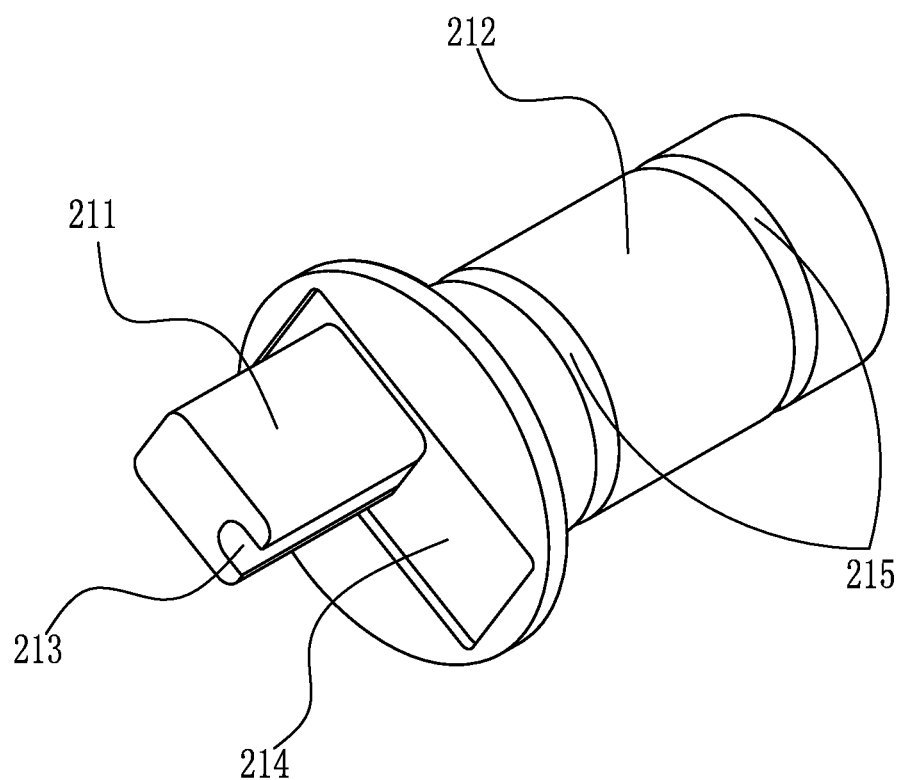
FIG. 3 is an isometric view of a connector of the upright lamp having length adjustment lamp-post of FIG. 1.

As shown in FIG. 3, the connector 21 includes a connecting base 212, a plug 211 disposed in the connecting base 212, and a hole 213 opened in the plug 211 along the axial direction thereof. In the present embodiment, the connector 21 is made of plastic and the plug 211 is integrated with the connecting base 212. The plug 211 is arranged along the axial direction of the connecting base 212 and is inserted into the jack 11. The plug 211 has a uniform cross section area and cross section shape with that of the jack 11. In result, the outer wall of the plug 211 touches tightly with the inner wall of the jack 11. Understandably, the cross section shape of the plug 211 is rectangle type when it is assumed that the hole 214 has no being opened thereon. The connecting base 212 may be a cylinder, a cuboid, or a cube. In the present embodiment, the connecting base 212 is a hollow cylinder. The hole 213 is opened along the axial direction of the plug 211 and configured for connecting the plug 211 and the lamp-post 10. The hole 213 is intersected with a side wall of the plug 211 so as to the hole 213 has a notch and a U-typed shape in cross section along the axial direction. The notch is faced to the side wall of the plug 211 when the plug 211 is inserted into the jack 11. The hole 213 may be a blind hole or a through hole. In the present embodiment, the hole 213 is a through hole. Moreover, the connector 21 further includes a concave 214 which is opened on a surface thereof which is faced to the lamp-post 10. The concave 214 has a same cross section area with that of the lamp-post 10. When the lamp-post 10 is assembled into the connector 21, the concave 214 can hide the gap formed between the lamp-post 10 and the connector 21 so as to add beauty.

In order to tightly connect with each other, the clamping sleeve 22 is a hollow cylinder which is as same as the connecting base 212 and includes a flange 221 disposed one end thereof. The inner diameter of the clamping sleeve 22 has a same size with the outer diameter of the connecting base 212. The clamping sleeve 22 further includes a external thread opened on the outer side wall thereof for disposing the clamp nut 23.

The clamp nut 23 is threaded onto the clamping sleeve 22. When mounting the upright lamp 100, a mounting plate is clamped between the clamp nut 23 and the flange 221 of the clamping sleeve 22 via tightening the clamp nut 23. Moreover, the connector 22 is inserted into the clamping sleeve 22 and the lamp-post 10 is disposed on the connector 22. In result, the upright lamp 100 can be mounted onto the mounting plate which is a part of occasion.

The gasket 24 is configured for further retaining and enhancing the tightening force of the clamp nut 23. The gasket 24 may be elastic C-typed ring, or a compressed fiber ring, and so on. The gasket 24 is clamped between the mounting plate and the clamp nut 23.

The mounting base module 20 further includes at least one annular ring 25. In the present embodiment, the mounting base module 20 includes two annular rings 25. As shown in FIG. 3, at least one annular groove 215 is opened on the outer wall of the connecting base 212 and is configured for receiving the annular ring 25. In the present embodiment, two annular grooves 215 are disposed on the connecting base 212. The annular ring 25 may be made of rubber. In assemble, the annular ring 25 can be drawn back and embedded into the annular groove 215 to restrict the position thereof. As show in FIG. 4, the annular ring 25 is stretched or squeezed when the connecting base 212 is inserted into the clamp sleeve 22 so as to retain the relative position of the connecting base 212 and the clamp sleeve 22.

Figure 4:
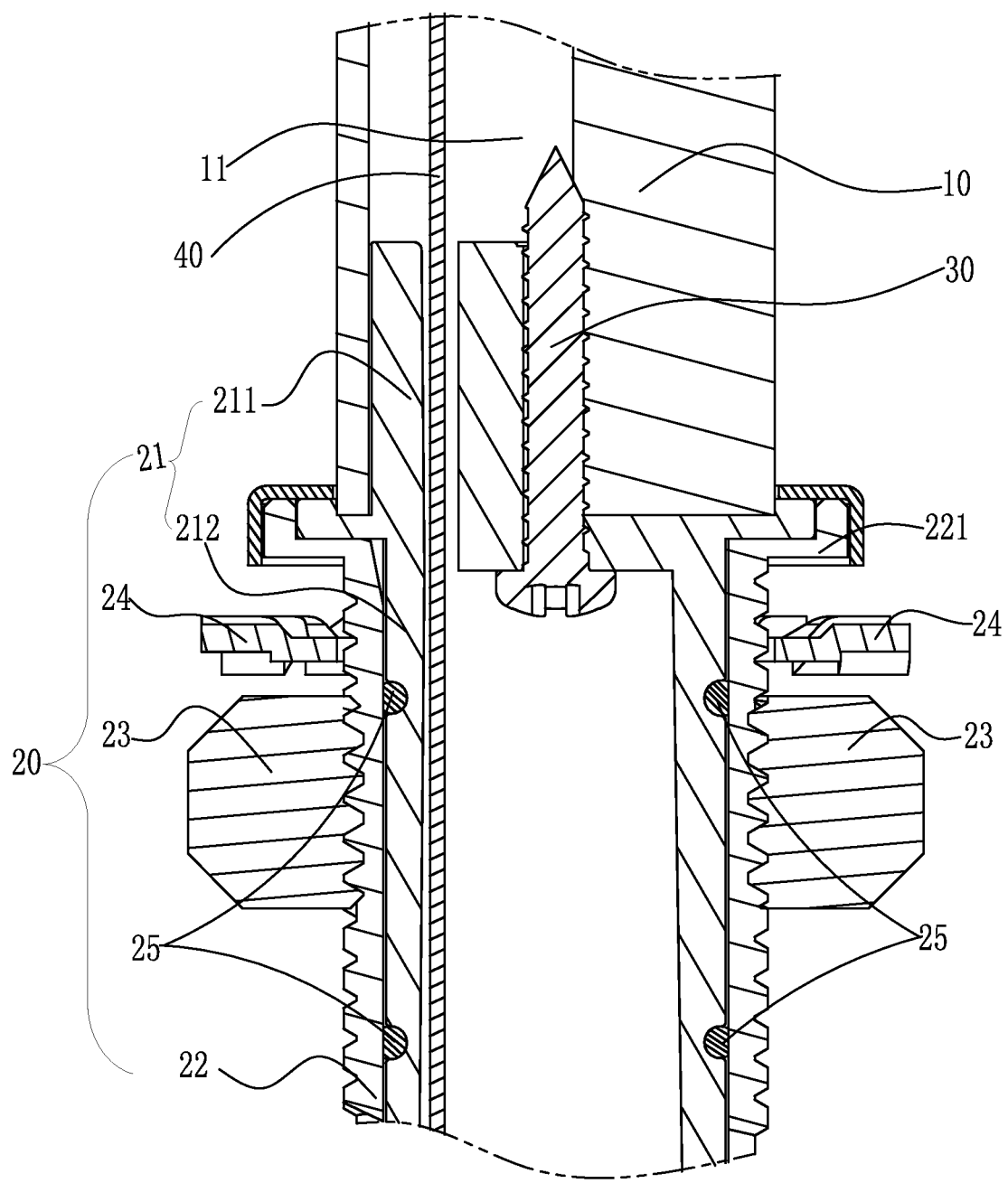
FIG. 4 is a section view of the upright lamp having length adjustment lamp-post of FIG. 2.

The fastener 30 may be a screw, pin, and so on and has a same cross section shape and same cross section area with that of the hole 213. Referring to FIG. 3 and FIG. 4, in assemble, the fastener 30 is threaded into the hole 213 after the plug 211 is inserted into the jack 11. Since the hole 213 is intersected with the side wall of the plug 211, the volume formed by the inner walls of the hole 213 and the jack 11 is less than that of the fastener 30. Moreover, the plug 211 has a same cross section area with that of the jack 11, in result, an interference fit joint between the fastener 30 and the volume formed by the hole 214 and the jack 11 is achieved. And so, the connector 21 is connected with the lamp-post 10. It can be understood that the lamp-post 10 may be cut randomly and the connector 21 can be mounted into the lamp-post 10 as long as the lamp-post 10 has the jack 11.

As well know for a person skilled in the art, a traditional light source or LED can be mounted onto the lamp-post 10. In the present embodiment, the light source includes three LEDs. The upright lamp 100 further includes two wires 40. As shown in FIG. 4, for beauty, the wire 40 is hidden into the inner of the lamp-post 10. When the lamp-post 10 needs to cut, the wire 40 can be drawn out of the lamp-post 10.

In mounting the upright lamp 100, the mounting base module 20 should be firstly mounted onto the mounting plate, and then the lamp-post 10 is inserted into the plug 211 of the connector 21. Finally, the fastener 30 is threaded into the hole 213.

The upright lamp 100 includes the jack 11 opened in the lamp-post 10, and the plug 211 which has a same cross section shape and area with that of the jack 11. And the plug 211 has a hole 213 which is intersected with the side wall of the jack 11. When the fastener 30 is threaded into the volume formed by the plug 211 and the lamp-post 11, the interference fit joint between the fastener 30 and the volume is realized as the volume is less than that of the fastener 30. And then, the mounting base module 20 and the fastener 30 are assembled onto the lamp-post 10. Moreover, the lamp-post 10 may be cut randomly and the connector 21 can be mounted into the lamp-post 10 as long as the lamp-post 10 has the jack 11.

Figure 5:
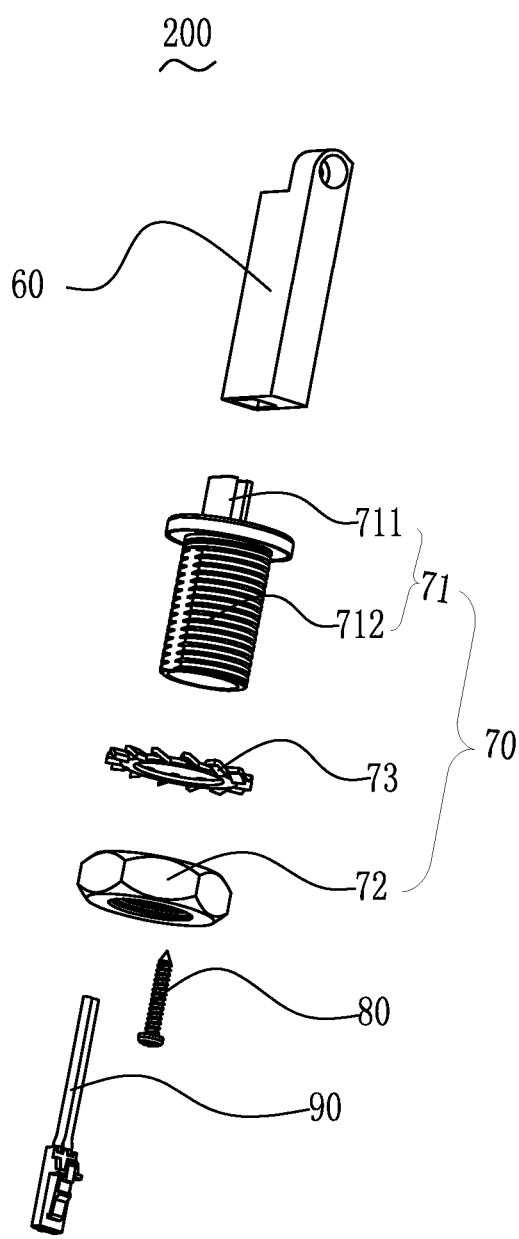
FIG. 5 is an explosive view of an upright lamp having length adjustment lamp-post according to a second embodiment.

As shown in FIG. 5, an upright lamp 200 having length adjustable lamp-post is described according to a second embodiment. The upright lamp 200 includes a lamp-post 60, a mounting base module 70 disposed in the lamp-post 60, and a fastener 80 configured for connecting the lamp-post 60 and the mounting base module 70. Contrasting with the upright lamp 100 of the first embodiment, the mounting base module 70 has some differences with the mounting base module 20.

The mounting base module 70 includes a connector 71, a clamp nut 72, and a gasket 73. The connector 71 includes a plug 711, and a connecting base 712 disposed on the plug 711. The connecting base 712 has a flange disposed between the plug 711 and the connecting base 712. The mounting base module 70 has no the clamping sleeve 20 described in the first embodiment. An external thread is directly disposed on the outer wall of the connecting base 712. When the connecting base 712 is arranged onto a mounting plate, the clamp nut 72 and gasket 73 can directly threaded onto the connecting base 712 and the mounting plate is clamped between the flange of the connecting base 712 and the clamp nut 72. As well known, the upright lamp 200 further includes at least two wires 90 which are disposed in inner of the lamp-post 10.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An upright lamp having length adjustable lamp-post comprising a lamp-post, a plug mounted on the lamp-post, and a fastener configured for connecting the lamp-post and the plug, the lamp-post having a jack opened therein, the plug being inserted into the jack, the plug having a uniform cross section area and cross section shape with that of the jack, a hole being opened in the plug along axial direction thereof and being configured for receiving the fastener, the hole being intersected with a side wall of the plug, the fastener being threaded into the hole after the plug is inserted into the jack.

2. The upright lamp having length adjustable lamp-post of claim 1, wherein the upright lamp further comprises a mounting base module, the mounting base module comprises a connector, the connector comprises a connecting base, the plug is disposed on the connecting base.

3. The upright lamp having length adjustable lamp-post of claim 2, wherein the connector has a concave which is opened on a surface of the connector which is faced to the lamp-post, the concave has a uniform cross section area and cross section shape with that of the lamp-post.

4. The upright lamp having length adjustable lamp-post of claim 2, wherein the mounting base module further comprises a clamp nut, the clamp nut is screwed onto the connecting base, the connecting base has a tubular structure, an outer thread is disposed on the connecting base.

5. The upright lamp having length adjustable lamp-post of claim 4, wherein the mounting base module further comprises a gasket, the gasket is arranged between the clamp nut and the connecting base.

6. The upright lamp having length adjustable lamp-post of claim 2, wherein the mounting base module further comprises a clamping sleeve and a clamp nut, the clamp nut is thread onto the clamping sleeve, the clamping sleeve is mounted on an outer wall of the connecting base and has an external thread disposed thereon which is cooperated with the clamp nut, an inner diameter of the clamping sleeve has a same size with that of an outer diameter of the connecting base.

7. The upright lamp having length adjustable lamp-post of claim 6, wherein the mounting base module further comprises at least one annular ring, at least one annular groove is opened on the outer wall of the connecting base and is configured for receiving the annular ring.

8. The upright lamp having length adjustable lamp-post of claim 1, wherein the fastener is a screw.

9. The upright lamp having length adjustable lamp-post of claim 8, wherein the hole has a cross section which is an arc, the arc has a same radius with the screw.

\* \* \* \* \*